United States Patent
Nordquist et al.

(12) 
(10) Patent No.: US 6,336,767 B1
(45) Date of Patent: Jan. 8, 2002

(54) COUPLING DEVICE HAVING TWO COUPLING MEMBERS AND CLAMPING MEANS

(75) Inventors: Hakon Nordquist, Täby; Robert Nielsen, Nacka, both of (SE)

(73) Assignee: System 3R International A.B., Vallingby (SE)

( * ) Notice: Subject to any disclaimer, the term of this patent is extended or adjusted under 35 U.S.C. 154(b) by 0 days.

(21) Appl. No.: 09/465,011

(22) Filed: Dec. 16, 1999

(30) Foreign Application Priority Data

Dec. 16, 1998 (DE) ............................. 198 57 913

(51) Int. Cl.$^7$ ................................... B23Q 1/06
(52) U.S. Cl. ................................... 403/353; 403/282
(58) Field of Search ................... 403/345, 353, 403/376, 374, 282, 315; 269/310

(56) References Cited

U.S. PATENT DOCUMENTS

| | | | |
|---|---|---|---|
| 2,309,713 A | * 2/1943 | Ratkowski | ............ 403/274 X |
| 4,449,027 A | 5/1984 | Fujikawa | |
| 4,838,533 A | 6/1989 | Büchler | |
| 4,855,558 A | 8/1989 | Ramsbro | |
| 5,154,559 A | * 10/1992 | Wagner | ............ 403/282 X |
| 5,791,803 A | 8/1998 | Nordquist | |
| 6,123,339 A | * 9/2000 | Otsuji et al. | ............ 277/602 |
| 6,152,436 A | * 11/2000 | Sonderegger et al. | ....... 268/310 |

* cited by examiner

Primary Examiner—Lynne H. Browne
Assistant Examiner—John R. Cottingham
(74) Attorney, Agent, or Firm—Jacobson Holman, PLLC

(57) ABSTRACT

A coupling device formed from a first coupling member and a second coupling member with a clamping structure for axially clamping the coupling members. At least three prismatic pins project from the first coupling member each of which is provided with at least one prismatic surface at at least one of the sides of the prismatic pin, and wherein three spaced z-reference surfaces are formed from the first coupling member which extend within a common x-y-plane transverse to the clamping direction. At least three grooves are formed in the second coupling member which are disposed in correspondence to the position of the prismatic pins and which are provided with axially elastic elements for exact positioning the coupling members relative to each other within the x-y-plane. The z-reference surfaces are formed from the free end surfaces of the prismatic pins and z-counter reference surfaces are formed from the base of each groove.

9 Claims, 2 Drawing Sheets

COUPLING DEVICE HAVING TWO COUPLING MEMBERS AND CLAMPING MEANS

BACKGROUND OF THE INVENTION

1. Field of the Invention

The invention refers to a coupling device having two coupling members and clamping means for axially clamping both coupling members. At least three prismatic pins project from the first coupling member each of which is provided with a prismatic surface at at least on side thereof. At least three circumferentially spaced z-reference surfaces are formed from the first coupling member which extend within an x-y-plane which is perpendicular to the clamping direction. The second coupling member comprises at least three grooves in a circumferential position corresponding to the circumferential arrangement of the prismatic pins. Axially elastic elements are provided at the grooves for a precise positioning of the coupling members relative to each other within the x-y-plane.

2. Description of Related Art

A clamping device is disclosed in the document EP-A-255 042 (=U.S. Pat. No. 4,855,558) wherein one of both coupling members is provided with a plurality of projecting posts. For a precise positioning of both coupling members relative to each other in z-direction the free end surfaces of the posts are formed as z-reference surfaces. A corresponding plurality of z-counter reference surfaces are formed on the other coupling member in an arrangement corresponding to the arrangement of the posts. All z-counter references extend within a common plane and cooperate with the z-reference upon clamping. A different arrangement for positioning two coupling members in z-direction is disclosed in German utility model 295 21 030 (=U.S. Pat. No. 5,791,803).

SUMMARY OF THE INVENTION

The invention is based on the problem to improve the means for positioning both coupling members in z-direction.

To this end the above-mentioned coupling device has one coupling member provided with prismatic pins, the free end surfaces of which are formed as z-reference surfaces. The second coupling member is formed with grooves which are arranged in correspondence to the position of the prismatic pins. The base of each groove is provided with a z-counter reference surface adapted to cooperate with one of the z-reference surfaces during clamping of both coupling members. All z-counter reference surfaces extend within a common plane. Thus, according to the invention the prismatic pins are utilized firstly for providing proper references serving for angular adjustment of the second removable coupling member with respect to the first coupling member, and secondly for providing z-reference surfaces for allowing precise z-positioning of both coupling members. Correspondingly, the grooves in the second coupling member serve firstly for proper angular positioning the second coupling member with respect to the first one and secondly for creating proper z-counter reference surfaces. Thus, the invention allows for omitting separate posts or similar means from one of the coupling members for positioning the coupling members in z-direction. Moreover, the invention allows for obtaining a very high precision of positioning one coupling member with respect to the other coupling member in angular direction and z-direction even if both coupling members are very often separated (unclamped) and again clamped.

Preferably the z-counter reference surfaces are formed upon a vertical projection from the base of each groove. In cases where each groove includes an insert of general U-shaped configuration the basic part of which is mounted to the projection for allowing the prismatic pin to enter the insert during clamping the center of the basic part may be formed to a z-counter reference surface. Alternatively the projection may extend upwardly over the basic part for being formed with the z-counter reference surface.

The invention is of specific relevance when working on a workpiece which is mounted to the movable coupling member whereas the other coupling member may be fixedly mounted to the head of a machine tool. In such cases normally only a small exterior axial force is acting upon the clamped coupling members. However, there are different possibilities of utilizing the coupling devices according to the invention wherein the clamped coupling members are subjected to a substantial axial load. Such a situation is encountered for example when producing a die-pressed part from metal powder wherein a first coupling device is connected in between a movable press ram and a first die associated to the press ram, and a second coupling device is connected in between a counter support and a second fixed die. The substantial pressing force which has to be applied for pressing the metal powder which is within both dies to the desired die moulded part acts upon the clamped coupling members in the direction of the clamping force developed by the clamping means. The precision of the z-positioning of both coupling members may be impaired by a pressing force exceeding a given threshold value.

For securing the precision of the z-positioning under very high axial load on the clamped coupling members an embodiment of the invention provides for a plurality of circumferentially spaced posts on one coupling member, each post having at its free end an additional z-reference surface, and for providing additional z-counter reference surfaces on the other coupling member which are arranged in correspondence to the additional z-reference surfaces.

Thereby, the solidity of the z-positioning is increased because the outer load is devided among a greater surface formed by the reference surfaces altogether. Preferably, the additional z-counter reference surfaces are made on the upper side of the coupling member supporting a die.

If the precision of the z-positioning is not of very high relevance an embodiment of the invention may be made such that between each additional z-reference surface and each associated additional z-counter reference surface a distance of one or a few $\mu$m is left when both coupling members are clamped, i.e. the z-counter reference surfaces abut the z-reference surfaces. When the axial load should be minor only the z-reference surfaces and the z-counter reference surfaces cooperate for z-positioning. If the load will be high the additional z-counter reference surfaces will engage the additional z-reference surfaces. However, the invention may be carried out also in such a way that in case of minor load only the additional z-counter reference surfaces abut the additional z-reference surfaces and a short distance may be left between the z-counter reference surface and the z-reference surface when both coupling members are clamped. The last mentioned embodiment of the invention is advantageous therein that any deformation of the posts caused by high load has no influence on the adjustment of the coupling members with respect to each other within the x-y-plane.

Further preferred embodiments of the invention are identified in the sub-claims.

BRIEF DESCRIPTION OF THE DRAWING

The invention will be disclosed more in detail hereinafter with reference to the accompanying drawing.

DESCRIPTION OF THE PREFERRED EMBODIMENTS

Figure 1:
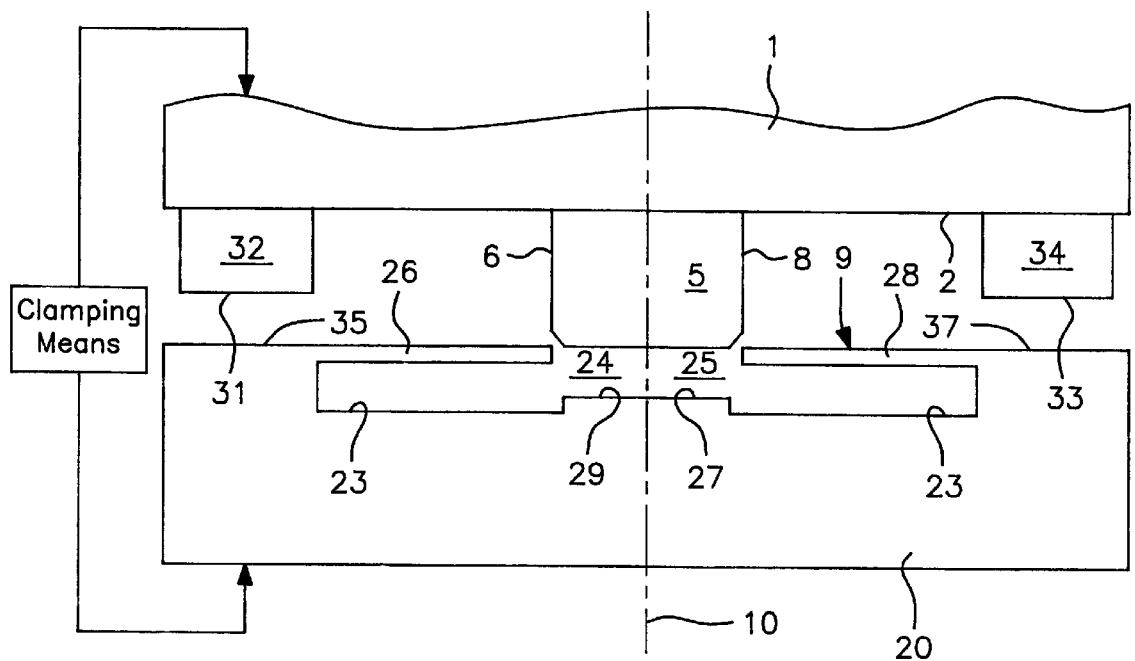
FIG. 1 shows a schematic representation of two coupling members which are approaching for being clamped and adjusted in x-y-plane.

The first coupling member 1 may be mounted to the head of a not shown machine tool, e.g. a die-sinking electric erosion machine. The first coupling member 1 comprises a substantially flat undersurface 2 which extends transversely to an axis 10 usually designated as z-direction or z-axis. Four crosswise arranged prismatic pins project from the underside 2 which are circumferentially equally spaced and from which FIG. 1 shows only prismatic pin 5. All prismatic pins are of same construction so that only prismatic pin 5 is described hereinafter in detail. The prismatic pin 5 has two plane opposite prismatic surfaces 6, 8. Everyone of the prismatic surfaces 6, 8 extends obliquely with respect to the axis 10 so that the prismatic pin 5 tapers towards its free end-surface. The inclination of the prismatic surfaces 6, 8 with respect to the axis 10 is small and therefore cannot be clearly seen from the representation of FIG. 1.

The free end surface 4 of prismatic pin 5 is formed as a plane z-reference surface which extends exactly perpendicularly to the axis 10. It is to be noted that the free end surfaces of all prismatic pins are also formed as z-reference surfaces in such a way that all z-reference surfaces extend within a common plane perpendicular to the axis 10. In the described embodiment of the invention the coupling member 1 is provided with four crosswise arranged z-reference surfaces.

The second movable coupling member 20 supports a workpiece which is mounted to the underside 21 of the coupling member 20. The workpiece is intended to be worked upon by the machine tool. Four grooves are formed in the second coupling member 20, each being open to the upper side 9 of coupling member 20. For clamping the upper side 9 of coupling member 20 faces the underside 2 of the first coupling member 1. The four grooves are arranged within the coupling member 20 in correspondence to the position of the prismatic pins 5 of the first coupling member. The figures represent only groove 24 because all grooves are of same construction. A lip 26 integral with the body of the second coupling member 20 extends over the groove 24 proceeding from one side thereof. Lip 28 which has same length and same width as lip 26 and which is also integral with coupling member 20 extends over the groove 24 from the side opposite to the lip 26. Instead of being integral with the body of the coupling member 20 each lip 26, 28 may be an end section of spring steel segments welded upon a blank body for forming the coupling member 20. The lips 26, 28 are independent from each other and are axially elastic. As shown in FIG. 1, 2 the free ends of the opposing lips 26, 28 are spaced from each other for leaving free a central opening 25. The width of the opening 25 is greater than the width of the prismatic pin 5 when taken at the free end thereof and is smaller than the width of the prismatic pin 5 when taken at its base close to the underside 2. It may be seen from the figures that the cross section of each lip 26, 28 is rectangular. The outer upper free edges of each lip 26, 28 may be chamfered for adapting same to the inclination of the prismatic surfaces 6, 8.

A projection 27 raises centrally from the base 23 of the groove 24, i.e. centrally to the opening 25. The free surface of the projection 27 is made to a z-counter reference surface 29 extending exactly perpendicularly to the axis 10. The height of the projection 27 is substantially less than the distance of each of the lips 26, 28 to the base 23.

Figure 2:
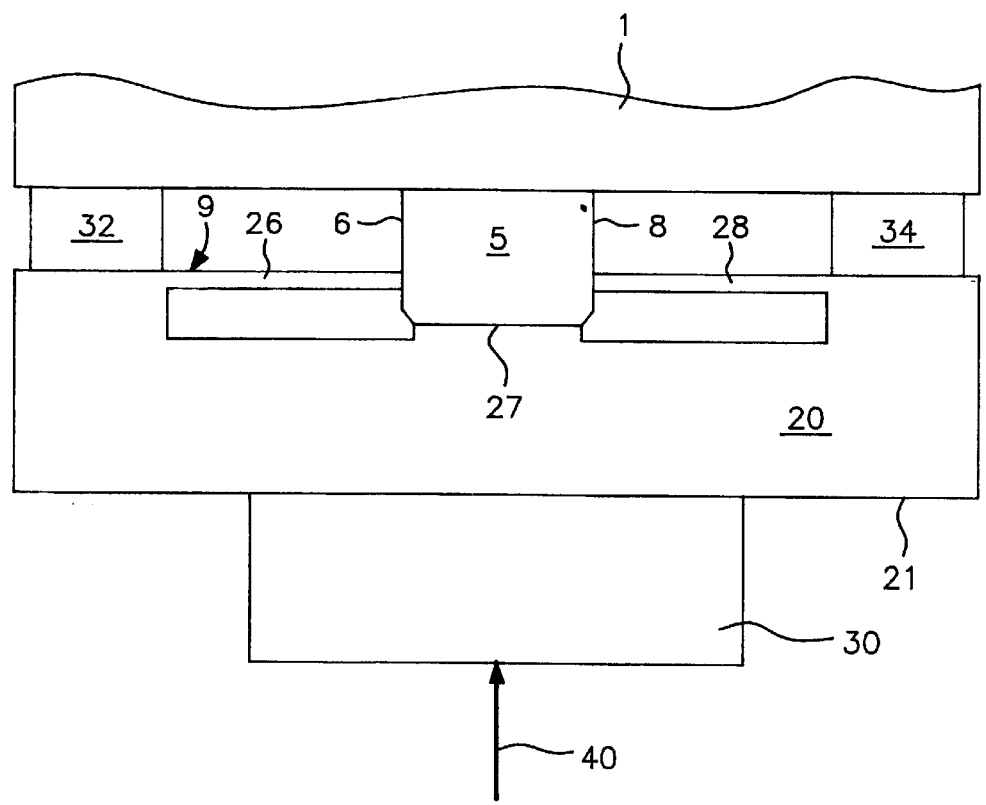
FIG. 2 shows a schematic representation of both coupling members according to FIG. 1 after clamping and under very high axial load.

A not shown clamping means for clamping and unclamping (releasing) both coupling members is disclosed in EP-A-255 042 (=U.S. Pat. No. 4,855,558). For starting clamping both coupling members 1, 20 according to FIG. 1 are brought together such that the free end of prismatic pin 5 enters the opening 25. When clamping the prismatic pin 5 penetrates deeper into the groove 24 until the edges of the lips 26, 28 abut prismatic surfaces 6, 8 and thereby adjust the coupling member 20 relative to the coupling member 1 within the x-y-plane. When further clamping the prismatic pin enters deeper the groove 24 through the opening 25 and the lips 26, 28 still being in engagement with surfaces 6, 8 bend axially inwardly, a situation which is not shown in the figures. The clamping means draw both coupling members 1, 20 together until the z-reference surface 4 abut the z-counter reference surface 29 (FIG. 2). When the abutment occurs the coupling member 20 is positioned exactly relative to the coupling member 1 in z-direction. For unclamping the clamping means releases both coupling member 1, 20 so that the coupling members 1, 20 may be separated. The prismatic pin 5 leaves the groove 24 through the opening 25 and finally the lips 26, 28 resume their initial position in view of their axial elasticity.

Figure 3:
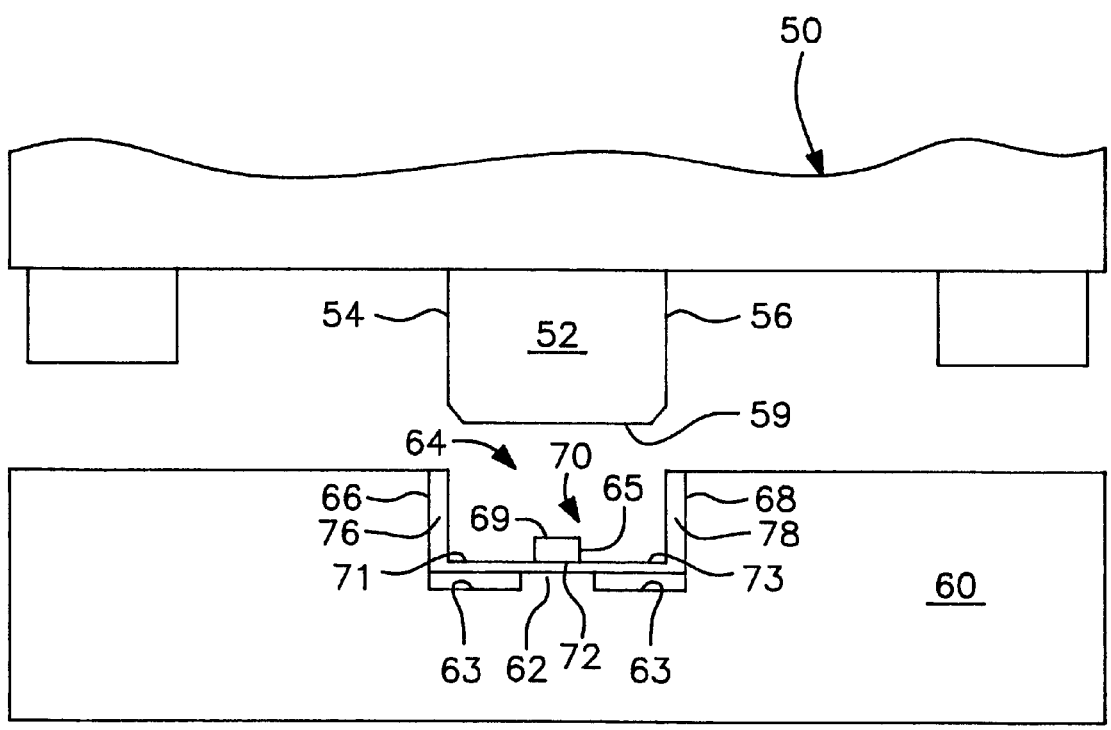
FIG. 3 shows a schematic representation of another embodiment of a coupling device according to the invention.

According to the embodiment of the invention shown in FIG. 3 the axial elastic lip 26, 28 are replaced by different axially elastic elements which comprise two opposite upright legs 76, 78 of an insert 70 of an overall U-formed configuration. The insert 70 has a basic part 72 connecting both legs 76, 78 which is mounted upon a central projection 62 raising above the base 63 of a groove 64 made within the coupling member 60. Leg 76 touches the adjacent upright flank 66 of groove 64 and leg 78 touches the adjacent upright flank 68 of groove 64. The basic part 72 comprises opposite lateral sections 71, 73 which are axially elastic. Therefore, the legs 76, 78 adjoining sections 71, 73 are also axially elastic. In a not shown embodiment of the invention the surface of the basic part 72 is made to a plane z-counter reference surface. In an alternative shown in FIG. 3 the basic part 72 is provided with a central opening through which an upright extension 65 of the projection 62 extends. The upper surface of the extension 65 is made to a z-counter reference surface 69. A prismatic pin 52 projects from the underside of the other coupling member 50 and is formed with two opposite lateral prismatic surfaces 54, 56 each of which includes a small angle with the axis 10. The free end surface 59 of prismatic pin 52 is made to a z-reference surface and therefore extends within an x-y-plane perpendicular to the axis 10.

Upon clamping the prismatic pin 52 enters the opening of the insert 70 between both legs 76, 78 until the free edges of legs 76, 78 engage the prismatic surfaces 54, 56. By such engagement the coupling member 60 is adjusted in the x-y-plane to the coupling member 50. When the clamping force becomes greater the prismatic pin 52 enters deeper the insert 70 and clamps legs 76, 78 between the flanks 66, 68 on one hand and the prismatic surfaces 54, 56 on the other hand. During such clamping the legs 76, 78 may move vertically along the flanks 66, 68 because the sections 71, 73 may bend inwardly in view of the fact, that as shown in FIG. 3 there is some clearance between the base 63 of groove 64 and sections 71, 73. Finally the clamping process regarding coupling members 60 and 50 will terminate when the z-reference surface 59 of prismatic 52 abuts z-counter reference surface 69 of extension 65.

In case a high load in clamping direction is exerted to the coupling member 20 clamped to coupling member 1 according to arrow 40 (FIG. 2) such load is transferred through the abutting surfaces 4 and 29 to prismatic pin 5 which as a result may tend to upset. Such situation may occur during a press process for which a die 30 is mounted to the lower side 21 of the second coupling member 20 for producing die-formed parts. Upsetting of the prismatic pin 5 may cause an irregular thickening thereof which impairs the precision of the adjustment of the coupling member 20 with respect to the coupling member 1 within the x-y-plane. For removing such risk the coupling device according to the invention is provided with an additional group of z-reference surfaces and z-counter reference surfaces. To this end a plurality of circumferentially spaced posts 32, 34 project downwardly from the underside 2 of the coupling member 1 the free end surfaces of which are made to additional z-reference surfaces 31, 33. Additional z-counter reference surfaces 35, 37 are formed on the upper side of the coupling member 20 and are disposed thereon in correspondence to the position of the posts 32, 34. The z-reference surfaces 31, 33 extend within a common plane perpendicular to the axis 10, and the z-counter reference surfaces 35, 37 extend also within a common plane. For beginning with clamping the coupling member 20 approaches the coupling member 1. When the z-reference surface 4 is aligned with the upper side 9 of the coupling member 20 the distance of the z-reference surface 4 to the z-counter reference surface equals the distance of one of the additional z-reference surfaces 31, 33 to the associated additional z-counter reference surface 35, 37.

Therefore, in the moment, when the z-reference surface 4 abuts the z-counter reference 29 also the additional z-reference surfaces 31, 33 abut the additional z-counter reference surfaces 35, 37. The exterior load 40 may therefore be resumed by a greater number of surfaces which excludes the risk of an influence of the load 40 on the precision of the adjustment of both coupling members 20, 1 in x-y-plane.

In another embodiment of the invention the axial arrangement of the additional z-reference surfaces and the additional z-counter reference surfaces may be made with respect to the z-reference surfaces and the z-counter reference surfaces associated with a groove such that the distance of the z-reference surface 4 to the z-counter-reference surface 29 is for one or a few $\mu$m greater than the distance between one of the additional z-reference surfaces 31, 33 and the associated additional z-counter reference surfaces 35, 37 when the z-reference surface 4 is aligned with the upper side 9 of coupling member 20 during approach thereof to coupling member 1. When the coupling members 1, 20 of this embodiment are clamped at first the additional z-reference surfaces 31, 33 abut the associated additional z-counter reference surfaces 35, 37 whereas the z-reference surface 4 and the z-counter reference surface 29 are separated from each other by one or a few $\mu$m. Only if the axial exterior load 40 exceeds a predetermined value also the z-reference surface 4 and the z-counter reference surface 29 abut. Such embodiment of the invention is advantageous therein that a deformation of one or more of the posts 32, 34 under the heavy load 40 has no influence on the adjustment of the coupling member 20 with respect to coupling member 1 within the x-y-plane.

The invention is also useful for a clamping device disclosed in DE-U-295 21 030 (=U.S. Pat. No. 5,791,803). In such or similar cases one of the lips 26, 28 may be omitted so that the groove 24 is limited laterally by a hard upright flank where the lip 9 is removed. The prismatic pin is provided with only one prismatic surface associated to the remaining lip. Clearly, the projection raising from the base of the groove is no longer arranged centrally with respect to said base.

What is claimed is:

1. Coupling device comprising a first coupling member and a second coupling member and clamping means for axially clamping said coupling members together in a clamping direction defined as the z-axis direction, at least three prismatic pins projecting from the first coupling member, each of said pins provided with a prismatic surface at at least one pin side, a first set of at least three circumferentially spaced references being formed from the first coupling member and which extend in a common plane defined as the x-y plane, transverse to the z-axis direction, each of said references defining a z-reference, the second coupling member comprising at least three grooves arranged in correspondence to the individual positions of the prismatic pins, and axially elastic elements being provided at each groove for precise positioning of the coupling members relative to each other within the x-y-plane, wherein the z-references of the first set are formed at free ends of said prismatic pins, and a first counter set of references are formed from the base of each groove, and define z-counter references and wherein the first coupling member is provided with a second set of circumferentially spaced z-references extending in a common x-y-plane transverse to the clamping direction, and the second coupling member is provided with a second counter set of z-counter references arranged in correspondence to the positions of the z-references of the second set such that when the coupling members are clamped together at a first load, each z-reference of one of the sets is spaced from the corresponding z-counter reference of the related counter set to leave a clearance therebetween, and each z-reference of the other set abuts the corresponding z-counter reference, and when the coupling members are clamped by a load higher than said first load, all z-references of the first and the second set abut their corresponding z-counter references of the first and the second counter sets.

2. Device according to claim 1 wherein the first set of z-counter references are surfaces formed upon an upright projection from the base of each groove.

3. Device according to claim 2 wherein the axially elastic elements comprise upright legs of an insert within each groove and having a base position mounted to a projection extending from the bottom of each groove.

4. Device according to claim 3 wherein the base portion at least partially is formed to a z-counter reference surface.

5. Device according to claim 3 wherein said projection includes an extension extending through an opening of the base portion, said first set of z-counter references comprising surfaces formed on top of each said extension.

6. Device according to claim 1 wherein said second set of z-references comprises a set of circumferentially spaced posts, having free end surfaces, and wherein said second counter set of references are surfaces disposed in correspondence to the position of the posts.

7. Device according to claim 6 wherein the second set of z-counter reference surfaces are formed from an upper side of the second coupling member.

8. Device according to claim 1 wherein each of said first set of z-references and z-counter references, and each of said second set of z-references and z-counter references are planar surfaces.

9. Device according to claim 1 wherein said first and second sets of z-references and z-counter references are disposed circumferentially and are interposed with respect to each other such that every first z-reference and counter z-reference alternates with every second z-reference and counter z-reference.

* * * * *